(12) United States Patent
Ohno et al.

(10) Patent No.: US 7,349,182 B2
(45) Date of Patent: Mar. 25, 2008

(54) MAGNETIC RECORDING MEDIUM

(75) Inventors: Mikio Ohno, Kanagawa (JP);
Tomohiro Ichikawa, Kanagawa (JP);
Tatsuo Ishikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 591 days.

(21) Appl. No.: 11/049,877

(22) Filed: Feb. 4, 2005

(65) Prior Publication Data
US 2005/0175866 A1   Aug. 11, 2005

(30) Foreign Application Priority Data
Feb. 5, 2004   (JP)   .......................... P.2004-028927

(51) Int. Cl.
*G11B 5/78* (2006.01)
(52) U.S. Cl. ..................................... 360/134
(58) Field of Classification Search ................ 360/134, 360/135, 131
See application file for complete search history.

(56) References Cited

U.S. PATENT DOCUMENTS

| | | | |
|---|---|---|---|
| 5,922,483 A | 7/1999 | Takahashi et al. | |
| 7,253,991 B2 * | 8/2007 | Fontana et al. | 360/126 |
| 2005/0170217 A1 * | 8/2005 | Takahashi et al. | 428/694 ST |
| 2007/0231613 A1 * | 10/2007 | Takahashi et al. | 428/842 |

FOREIGN PATENT DOCUMENTS

| | | |
|---|---|---|
| EP | 0 567 279 A1 | 10/1993 |
| EP | 1 033 244 A2 | 9/2000 |
| EP | 1 143 422 A2 | 10/2001 |
| JP | 7-6351 A | 1/1995 |
| JP | 8-45060 A | 2/1996 |
| WO | WO 96/00438 A1 | 1/1996 |

OTHER PUBLICATIONS

European Search Report dated Apr. 14, 2005.
John Wiley & Sons, Inc., "Encyclopedia of Polymer Science and Engineering", (1987) vol. 10, pp. 9-10.
John Wiley & Sons, Inc., "Polymer Handbook" (1999) Fourth Edition, pp. V11/2-V11/3.
European Office Action dated Sep. 8, 2006.

* cited by examiner

*Primary Examiner*—Fred F. Tzeng
(74) *Attorney, Agent, or Firm*—Sughrue Mion, PLLC

(57) ABSTRACT

A magnetic recording medium for being used in a write/read system in which a difference of track width between write track width and read track width is smaller than 10 μm, which comprises: a magnetic layer containing ferromagnetic powder and a binder; a nonmagnetic support; and a back-coating layer, in this order, at least one of the magnetic layer and the backcoating layer having servo signals for tracking control pre-recorded therein, wherein the nonmagnetic support is a film of a polyester having an intrinsic viscosity of 0.40 to 0.60 dl/g and a number average molecular weight of 12000 to 24000.

8 Claims, No Drawings

MAGNETIC RECORDING MEDIUM

FIELD OF THE INVENTION

This invention relates to a magnetic recording medium excellent in servo characteristics as well as electromagnetic characteristics.

BACKGROUND OF THE INVENTION

In practice of magnetic recording, analog recording has been being replaced by digital recording which provides digitally-encoded information that is more durable. Digital magnetic recording media and systems are required to be not only superior in image and sound quality but compact and space-saving. Digital recording generally needs more signals than analog so that magnetic recording media for digital recording are required to enable higher density recording.

A magnetoresistive (MR) head for reading based on MR effects has recently been extending its use. An MR head provides a few times as much output as an inductive head. Besides, an MR head achieves great reduction of noise created by equipment, such as impedance noise. This means that reduction of noise of a magnetic recording medium per se enables satisfactory signal reproduction and brings about remarkable improvement on high density recording characteristics. Solutions for minimizing the noise of a magnetic recording medium per se include particle size reduction of ferromagnetic powder and smoothing the magnetic layer surface.

Higher in-plane recording density in magnetic tape can be achieved by shortening the wavelength of recording signals thereby to increase the recording density in the longitudinal direction and by decreasing the recording track width thereby to increase the recording density in the width direction. To realize this, particle size reduction of ferromagnetic powder, increase in packing density, and smoothing the magnetic layer surface are demanded.

Changes in environmental temperature or humidity cause a magnetic tape medium to extend or contract in its width direction. Where magnetic tape has a small track width, such expansion or contraction can cause off-track errors. This problem has generally been settled by reducing the thermal and hygroscopic expansion coefficients of the tape to such a level at which an off-track distance may not exceed several micrometers. This is because the difference between write track width and read track width in conventional write/read systems is more than 10 µm (about $10^5$ to 13 µm). Since the write track width is sufficiently wider than the read track width, and the read track runs within the width of the write track, an off-track distance of several micrometers, if any, does not lead to output reduction.

However, as the write track width becomes smaller to cope with the demand for higher density recording, an off-track distance as small as about several micrometers will not be negligible. In other words, there has arisen a need to more strictly control tape expansion and contraction in the width direction against changes in environmental temperature and humidity conditions.

To meet the need, it is necessary not only to control the thermal and hygroscopic expansion coefficients of a nonmagnetic support of magnetic tape but to determine and control other physical properties of the nonmagnetic support that are influential on tape expansion and contraction. Related art concerning a magnetic recording medium of which the nonmagnetic support has any controlled physical property other than thermal and hygroscopic expansion coefficients includes a magnetic recording medium of which the nonmagnetic support is made of polyethylene naphthalate with a controlled molecular weight and a controlled density and a magnetic recording medium of which the nonmagnetic support has an optimized Young's modulus (see, for example, JP-A-7-6351 and JP-A-8-45060).

The techniques disclosed in JP-A-7-6351 and JP-A-8-45060 aim to secure the strength of a nonmagnetic support while preventing the raised edge (or high edge) phenomenon that occurs on slitting a tough film into tape, thereby to obtain a magnetic recording medium with high running durability. These publications are silent on reduction of an off-track distance in a write/read system having a reduced track pitch. Neither do they have a mention of the surface properties of the medium. Poor surface conditions of a magnetic tape result in a poor tape pack (poor tape pack wind quality), which deteriorates the running durability. The supports according to the publications cited above are inadequate for use in the latest high recording density magnetic recording media.

SUMMARY OF THE INVENTION

An object of the present invention is to provide a magnetic recording medium clearing the latest demand for high recording density that exhibits excellent electromagnetic characteristics and undergoes reduced expansion and contraction with change in environmental temperature and humidity conditions thereby assuring stable servo characteristics.

Another object of the invention is to provide a magnetic recording medium having a high S/N ratio, superior servo characteristics, and good tape pack quality.

The above objects of the invention are accomplished by a magnetic recording medium having a nonmagnetic support, a magnetic layer containing ferromagnetic powder and a binder provided on one side of the support, and a backcoating layer provided on the other side of the support. The magnetic layer or the backcoating layer has servo signals for tracking control pre-recorded therein. The medium is used in a write/read system in which the difference between write track width and read track width is smaller than 10 µm. The nonmagnetic support is a film of a polyester having an intrinsic viscosity of 0.40 to 0.60 dl/g and a number average molecular weight of 12000 to 24000.

In a preferred embodiment of the magnetic recording medium of the invention, the nonmagnetic support is a laminate polyester film composed of at least two layers and having a first surface (hereinafter referred to as surface A) on the magnetic layer side and a second surface (hereinafter refereed to as surface B) on the backcoating layer side. The surface A has a tracer system three-dimensional surface roughness (a stylus type, three-dimensional mean surface roughness) SRa (A) of 1 to 6 nm. The surface B has a tracer system three-dimensional surface roughness SRa (B) of 6 to 10 nm. SRa (A) is smaller than SRa (B).

In another preferred embodiment of the magnetic recording medium of the invention, a nonmagnetic layer containing nonmagnetic powder and a binder is provided between the nonmagnetic support and the magnetic layer.

By the use of a nonmagnetic support with a controlled intrinsic viscosity and a controlled molecular weight, there is provided a magnetic recording medium that exhibits excellent electromagnetic characteristics while ensuring stable servo characteristics in a write/read system for narrow-track, high-density recording and can be wound into a neat tape pack. The magnetic recording medium of this invention has superior electromagnetic characteristics with a high S/N ratio particularly in a write/read system for high density recording using an MR head. For tape applications, the medium of the invention provides stable servo characteristics and has excellent running durability with good tape pack wind quality and high edge strength.

DETAILED DESCRIPTION OF THE INVENTION

The magnetic recording medium of the invention has a nonmagnetic support, a magnetic layer provided on one side of the support, and a backcoating layer provided on the other side of the support. The magnetic layer or the backcoating layer has servo signals for tracking control pre-recorded therein. The medium is used in a write/read system in which the difference between write track width and read track width is smaller than 10 μm.

The servo signals for tracking control, i.e., for positioning a write or a read head of a magnetic recording apparatus are pre-recorded on the magnetic layer or the backcoating layer at a prescribed track pitch. The individual servo signals are sensed by a servo head to output reproduced signals. Comparison of the difference in amplitude between the reproduced signal of a pattern and those of another pattern provides information about the relative position of the head with respect to the tracks, whereby to conduct positioning (tracking) of a write or a read head.

The pattern or like particulars of the servo signals to be pre-recorded are not particularly limited. The servo signals may be pre-recorded on both the magnetic layer and the backcoating layer.

The write track width/read track width difference of the system to which the magnetic recording medium of the present invention is applied is smaller than 10 μm, preferably 8 μm or less. When run on a recording system using such a small write track width with a small difference from a read track width, the magnetic recording medium of the present invention hardly causes a head to be off-track, enabling stable servo tracking control.

The write/read system for recording and reproducing information with the above-recited write/read track widths is not particularly limited. Any known magnetic recording and reproducing apparatus having a write head, a read head, and a servo head can be used.

In the present invention, the physical properties of the nonmagnetic support, more specifically the intrinsic viscosity and the number average molecular weight of a polyester used as a nonmagnetic support are made appropriate to provide a magnetic recording medium having excellent electromagnetic characteristics suited to high density recording and enabling stable servo tracking in the above-described narrow-track-width write/read system.

The polyester used as a nonmagnetic support in film form has an intrinsic viscosity of 0.40 to 0.60 dl/g and a number average molecular weight of 12000 to 24000. These physical properties falling within the respective ranges recited, the polyester film exhibits high dimensional stability with suppressed expansion and contraction against changes in environmental temperature and humidity. With these physical properties, the polyester film also exhibits enhanced strength to assure durability of, especially the edge of, the resulting recording medium. If the intrinsic viscosity is less than 0.40 dl/g, or if the number average molecular weight is less than 12000, the polyester fails to have sufficient dimensional stability and, in addition, the polyester has poor film-forming properties, if, on the other hand, the intrinsic viscosity is more than 0.60 dl/g, or if the number average molecular weight is more than 24000, the film is too tough to secure running durability and good processability for slitting into tape widths and, moreover the polyester has poor flowability, which makes it difficult to mold into film. From all these considerations, a preferred intrinsic viscosity ranges from 0.45 to 0.55 dl/g, and a preferred number average molecular weight ranges from 14000 to 20000.

The intrinsic viscosity of a polyester is determined by measuring the relative viscosity of a dilute polyester solution in a 60/40 (by weight) mixture of phenol and 1,1,2,2-tetrachloroethane at several concentrations (c) with an automatic viscometer equipped with a Ubbellohde type capillary at 25° C., plotting versus c, and extrapolating to c=0. The number average molecular weight of a polyester is obtained as a polymethyl methacrylate equivalent value measured by gel-permeation chromatography on a polyester solution in hexafluoroisopropyl alcohol.

The elements constituting the magnetic recording medium of the invention will be described hereunder in detail.

The polyester used as a nonmagnetic support preferably includes one composed of a dicarboxylic acid component and a diol component, such as polyethylene naphthalate and polyethylene terephthalate.

Examples of the dicarboxylic acid component include terephthalic acid, isophthalic acid, phthalic acid, 2,6-naphthalenedicarboxylic acid, 2,7-naphthalenedicarboxylic acid, diphenylsulfonedicarboxylic acid, diphenyl ether dicarboxylic acid, diphenylethanedicarboxylic acid, cyclohexanedicarboxylic acid, diphenyldicarboxylic acid, diphenyl thioether dicarboxylic acid, diphenyl ketone dicarboxylic acid, and phenylindanedicarboxylic acid.

Examples of the diol component include ethylene glycol, propylene glycol, tetramethylene glycol, cyclohexanedimethanol, 2,2-bis(4-hydroxyphenyl)propane, 2,2-bis(4-hydroxyethoxyphenyl)propane, bis(4-hydroxyphenyl) sulfone, bisphenolfluorene dihydroxyethyl ether, diethylene glycol, neopentyl glycol, hydroquinone, and cyclohexanediol.

Of the polyesters composed mainly of the above-enumerated components, preferred are those composed of terephthalic acid and/or 2,6-naphthalenedicarboxylic acid as a main dicarboxylic acid component and ethylene glycol and/or 1,4-cyclohexanedimethanol as a main diol component from the standpoint of transparency, mechanical strength, and dimensional stability. Still preferred are those mainly comprising polyethylene terephthalate or polyethylene 2,6-naphthalate, co-polyesters formed of terephthalic acid, 2,6-naphthalenedicarboxylic acid, and ethylene glycol, and a polyester blend containing two or more of these polyesters as main ingredients. A polyester having polyethylene 2,6-naphthalate as a main constituent is particularly preferred.

The polyester making a nonmagnetic support may comprise other comonomer components or may contain other polyesters unless the effects of the present invention are not impaired. The other comonomer components and the other polyesters include the above-recited dicarboxylic acid components and diol components and polyesters obtained therefrom.

For the purpose of preventing a polyester film from delaminating, the polyester material may have an additional comonomer component other than those recited above incorporated, such as an aromatic dicarboxylic acid having a sulfonate group or an ester forming derivative thereof, a dicarboxylic acid having a polyoxyalkylene group or an ester forming derivative thereof, or a diol having a polyoxyalkylene group. Taking copolymerizability and transparency of the resulting film into consideration, particularly preferred comonomers include isophthalic acid 5-sodium sulfonate, terephthalic acid 2-sodium sulfonate, phthalic acid 4-sodium sulfonate, 2,6-naphthalenedicarboxylic acid 4-sodium sulfonate; compounds derived from these sodium salts by replacing sodium with another metal (e.g., potassium or lithium), an ammonium group, a phosphonium group, etc. or ester forming derivatives thereof; polyethylene glycol, polytetramethylene glycol, an ethylene glycol-propylene glycol copolymer, and compounds derived from these diol compounds by oxidizing the two terminal hydroxyl groups into carboxyl groups. The copolymerization ratio of the comonomer(s) introduced for that purpose is preferably 0.1 to 10 mol % based on the total dicarboxylic acid component content making up the polyester.

For the purpose of improving heat resistance, a bisphenol compound and/or a compound having a naphthalene ring or a cyclohexane ring may be copolymerized. The copolymerization ratio of the comonomer(s) is preferably 1 to 20 mol % based on the total dicarboxylic acid component content making up the polyester.

The method of synthesizing the polyester is not restricted. Any known processes of producing polyesters can be followed, such as a direct esterification process in which a dicarboxylic acid component and a diol component are esterified directly or an ester exchange process in which a dialkyl ester (as a dicarboxylic acid component) and a diol component are subjected to ester exchange, followed by heating under reduced pressure to remove the excess diol component thereby to conduct polymerization. If needed, a catalyst for ester exchange or a catalyst for polymerization can be used, or a thermal stabilizer can be added to the reaction system.

Various additives, including coloration inhibitors, antioxidants, nucleating agents, slipping agents, stabilizers, antiblocking agents, ultraviolet absorbers, viscosity modifiers, antifoam clarifiers, antistatic agents, pH adjusters, dyes, pigments, and reaction stoppers, may be added in any stage of the polyester synthesis.

The intrinsic viscosity and number average molecular weight of the polyester can be controlled by any technique, for example, through proper selection of the reaction time, temperature and pressure conditions, the kind of a reaction solvent, the monomer concentrations, the catalyst, and so on. Other techniques of obtaining a polyester with desired physical properties include, but are not limited to, (i) a method comprising monitoring the viscosity of the reaction mixture and stopping the reaction when the viscosity reaches a desired level, (ii) a method in which the relation between a number or weight average molecular weight of a product and a torque imposed on the stirrer of a reaction vessel is previously examined, and the polymerization reaction is stopped when the torque reaches a predetermined value, (iii) a method in which the relation between the number or weight average molecular weight of a produced polymer and the amount of water (in the case of direct polymerization) or an alcohol (in the case of ester exchange) driven out of the system during poly condensation is previously examined, and the polymerization reaction is stopped when a predetermined amount of water or an alcohol has been expelled, and (iv) a method in which polymerization is experimentally conducted to degrees exceeding a predetermined number average molecular weight level to find the relation between number average molecular weight and melt viscosity, and, at the time of film formation, the residence time of the polyester in an extruder, either before or after melting, is adjusted so that the melt viscosity may fall within a predetermined range.

It is preferred for the polyester film to have a Young's modulus of 7.0 to 8.6 GPa in a longitudinal direction and 5.4 to 8.0 GPa in a transverse direction. For applications to digital magnetic tape, it is unfavorable that the longitudinal Young's modulus exceeds 8.6 GPa because the sound caused by a rotating head of a digital video recorder striking the tape begins to resonate. Where the transverse Young's modulus is less than 5.4 GPa, the magnetic tape will have insufficient transverse strength so that the running tape may be folded down easily by guide pins.

It is preferred that the magnetic layer side (surface A) of the polyester film have a tracer system three-dimensional surface roughness SRa (A) of 1 to 6 nm, still preferably 2 to 5 nm, for forming thereon a magnetic layer with a smooth surface, maintaining appropriate running durability, and obtaining high output. It is preferred that the backcoating layer side (surface B) of the polyester film have a tracer system three-dimensional surface roughness SRa (B) of 6 to 10 nm for forming thereon a backcoating layer with appropriate surface roughness, suppressing an increase of frictional coefficient thereby to secure ease of film handling, preventing the surface profile of the surface B from being imprinted or transferred onto the surface A, which would make the magnetic layer rough, while the film is stored in roll form, and securing good tape pack wind quality.

The term "tracer system three-dimensional surface roughness" as used herein and symbolized by SRa (A) or SRa (B) refers to a value measured with a stylus type 3D profilometer in accordance with JIS B0601.

In order to provide the polyester film with the above-recited preferred surface roughness SRa (A) on its surface A, it is desirable to use a polyester containing not more than 0.1% by weight, preferably 0.06% by weight or less, of nanoparticles having an average particle size of 30 to 150 nm, preferably 40 to 100 nm. Incorporating such nanoparticles is also desirable from the viewpoint of durability of the magnetic layer provided thereon. Examples of suitable nanoparticles are silica, calcium carbonate, alumina, polyacrylic resin particles, and polystyrene particles.

It is preferred that the surface B be rougher than the surface A, i.e., SRa (A)<SRa (B), taking into consideration handling properties in the film forming process and in the manufacture of a magnetic recording medium, tape pack wind quality, and tape running properties.

The technique for producing a polyester support of which the surface B is rougher than the surface A is not particularly restricted. A preferred technique proposed by the inventors is to make a support using at least two polyester layers different in at least one of the kind, average particle size, and content of the nanoparticles incorporated therein. Such a laminate film is preferably prepared by coextrusion. The thickness of the polyester layer providing the surface B is preferably ½ to 1/10 of the total film thickness. The nanoparticles that can be incorporated into the polyester providing the surface B include calcium carbonate, silica, alumina, polystyrene particles, and silicone particles. A preferred average particle size of the nanoparticles is 80 to 800 nm, still preferably 100 to 700 nm. The amount of the nanoparticles to be added is preferably 0.05 to 1.0% by weight, still preferably 0.8 to 0.8% by weight.

The polyester film used in the invention can be manufactured in accordance with any known process. A laminate polyester film is produced by, for example, combining a polyester that provides the surface A and a polyester that provides the surface B in a single die and coextruded into a sheet at a temperature of from the melting point (Tm) to (Tm+70)° C., rapidly cooling the extruded sheet to 40° to 90° C. to obtain an unstretched laminate sheet, which is then biaxially stretched in a usual manner. The biaxial stretching is carried out by, for example, stretching the sheet in a first direction 2.5 to 4.5 times, preferably 2.8 to 3.9 times, at a temperature of from around (glass transition temperature (Tg)−10)° to (Tg+70)° C. and then in a second direction perpendicular to the first one 4.5 to 8.0 times, preferably 4:5 to 6.0 times, at a temperature of around Tg to (Tg+70)° C. If desired, the resulting biaxially stretched film can further be stretched in the first and/or the second direction. Multi-stage stretching (i.e., stretching in the same direction is conducted in two- to four- or even more divided stages) is recommended. A total stretch ratio in the biaxial stretching in terms of area stretch ratio is usually 12 or greater, preferably 12 to 32, still preferably 14 to 26. The biaxially stretched film thus obtained is usually subjected to heat setting at (Tg+70)° to (Tm−10)° C., e.g., 180° to 250° C. for inducing crystallization to gain excellent dimensional stability. The heat setting is preferably carried out for 1 to 60 seconds. It is a preferred manipulation for adjusting the percent heat shrinkage of the film that the stretched film is relaxed in the first and/or the second directions by not more than 3.0%, preferably 0.5 to 2.0%.

The ferromagnetic powder used in the magnetic layer includes ferromagnetic metal powder and hexagonal ferrite powder.

Ferromagnetic metal powder that can be used in the invention is preferably ferromagnetic alloy powder mainly comprising α-Fe. The ferromagnetic powder may contain, in addition to prescribed atoms, Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, Sm, P, Co, Mn, Zn, Ni, Sr, B, etc. Ferromagnetic powders containing at least one of Al, Si, Ca, Y, Ba, La, Nd, Co, Ni, and B in addition to α-Fe, particularly those containing at least one of Co, Al, and Y in addition to α-Fe are preferred. A preferred Co content is 10 to 40 atom % based on Fe. A preferred Al content is 2 to 20 atom % based on Fe. A preferred Y content is 1 to 15 atom % based on Fe.

The ferromagnetic metal powder can previously be treated with a dispersant, a lubricant, a surface active agent, an antistatic agent, and the like before being dispersed. The ferromagnetic metal powder may contain a small amount of water, a hydroxide or an oxide. The water content of the ferromagnetic metal powder is preferably adjusted to 0.01 to 2% by weight. The water content is preferably optimized depending on the kind of the binder. The pH of the ferromagnetic metal powder is usually 6 to 12, preferably 7 to 11. The pH is preferably optimized according to the kind of the binder. Although it is essentially preferred for the ferromagnetic metal powder to be free of inorganic soluble ions, such as Na, Ca, Fe, Ni, Sr, $NH_4$, $SO_4$, Cl, $NO_2$, and $NO_3$ ions, presence of up to 300 ppm of such inorganic ions in total is little influential on the characteristics. The ferromagnetic metal powder preferably has as low a void as possible. The void is preferably up to 20% by volume, still preferably 5% by volume or lower.

The ferromagnetic metal powder preferably has a crystallite size of 8 to 20 nm, still preferably 10 to 18 nm, particularly preferably 12 to 16 nm. The crystallite size as referred to here is an average calculated from a half value width of the X-ray diffraction peak by Scherrer's formula.

X-Ray diffractometry was carried out using RINT 2000 supplied by Rigaku Co., Ltd. equipped with a CuKaI ray source at a tube voltage of 50 kV and a tube current of 300 mA.

The ferromagnetic metal powder preferably has a BET specific surface area ($S_{BET}$) of 40 to 70 m$^2$/g, preferably 40 to 60 m$^2$/g. The $S_{BET}$ falling within that preferred range, the noise level can be controlled low while assuring satisfactory surface properties. The pH of the ferromagnetic metal powder, which should be optimized depending on the binder to be used in combination, preferably ranges 4 to 12, still preferably 7 to 10. If desired, the ferromagnetic metal powder is surface treated with 0.1 to 10% by weight of Al, Si, P or an oxide thereof based on the ferromagnetic metal powder. This surface treatment is effective in reducing the adsorption of lubricants, e.g., fatty acids, onto the surface of the particles to 100 mg/m$^2$ or less.

The ferromagnetic metal powder particles may have any of a needle shape, a spherical shape, a spindle shape, and a plate shape. Needle-like particles are particularly preferred. Needle-like ferromagnetic metal powder particles preferably have an average length of 30 to 60 nm, still preferably 30 to 50 nm and an acicular ratio of 4 to 12, still preferably 5 to 12. The ferromagnetic metal powder preferably has a coercive force (Hc) of 159.2 to 238.8 kA/m (2000 to 3000 Oe), still preferably 167.2 to 230.8 kA/m (2100 to 2900 Oe), a saturation flux density of 150 to 300 T·m (1500 to 3000 G), still preferably 160 to 290 T·m (1600 to 2900 G), and a saturation magnetization (σs) of 140 to 170 A·m$^2$/kg (140 to 170 emu/g), still preferably 145 to 160 A·m$^2$/kg (145 to 160 emu/g) The SFD (switching field distribution) of the ferromagnetic powder itself, a measure of the spread of individual particle coercivities, is preferably as small as possible. A preferred SFD is 0.8 or smaller. A magnetic tape having a small SFD shows satisfactory electromagnetic characteristics, high output, and a sharp magnetization reversal with a small peak shift, which is advantageous for high-density digital magnetic recording. The coercivity distribution can be narrowed by, for example, using goethite with a narrow size distribution, using mono-dispersed α-Fe$_2$O$_3$ particles, or preventing sintering of particles.

The ferromagnetic metal powder can be prepared by known processes, including reduction of water-containing iron oxide having been treated for sintering prevention or iron oxide with a reducing gas (e.g., hydrogen) into Fe or Fe—Co particles; reduction of a composite organic acid complex salt (mainly an oxalate) with a reducing gas (e.g., hydrogen); pyrolysis of a metal carbonyl compound; reduction of a ferromagnetic metal in the form of an aqueous solution by adding a reducing agent (e.g., sodium borohydride, a hypophosphite or hydrazine); and vaporization of a metal in a low-pressure inert gas. The resulting ferromagnetic metal powder may be subjected to a known slow oxidation treatment. For example, ferromagnetic metal powder obtained by reducing iron oxide or water-containing iron oxide with a reducing gas, such as hydrogen, is treated in an atmosphere having a controlled oxygen to inert gas ratio at a prescribed temperature for a prescribed time to form an oxide film on its surface. This slow oxidation technique is preferred for reduced involvement of demagnetization.

The hexagonal ferrite powder that can be used in the invention includes barium ferrite, strontium ferrite, lead ferrite, and calcium ferrite. Specific examples are barium ferrite and strontium ferrite of magnetoplumbite type; magnetoplumbite type ferrites coated with spinel; and barium ferrite and strontium ferrite of magnetoplumbite type containing a spinel phase in parts. These ferrites may contain additional elements, such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb. Usually, ferrites doped with Co—Zn, Co—Ti, Co—Ti—Zr, Co—Ti—Zn, Ni—Ti—Zn, Nb—Zn—Co, Sb—Zn—Co, Nb—Zn, etc. can be used. Depending on the raw materials or the processes adopted, some ferrites can contain intrinsic impurity.

The hexagonal ferrite powder preferably has an average length of 5 to 40 nm, still preferably 10 to 38 nm, particularly preferably 15 to 36 nm. The term "length" as used for the hexagonal ferrite powder means the maximum diameter of the hexagonal base of a hexagonal prism crystal, and the term "average length" is an arithmetic average of the diameter. The recited range of the average particle length is suited for high density magnetic recording because the thermal fluctuation can be reduced to stabilize the magnetization, and the noise is low. Where an MR head is used to increase the track density, a low noise should be achieved. In this connection, the average length is preferably 36 nm or smaller. The average thickness of the hexagonal ferrite particles is preferably 1 to 30 nm, still preferably 2 to 25 nm, particularly preferably 3 to 20 nm. The average aspect ratio (length to thickness ratio) of the hexagonal particles is desirably 1 to 15, more desirably 1 to 7. With the average aspect ratio being 1 or greater, sufficient orientation can be obtained while assuring a high packing density. An average aspect ratio greater than 15 results in increased noise due to particles' stacking. The particles within the above-recited size ranges have a BET specific surface area ($S_{BET}$) of 10 to 100 $m^2/g$, which approximately corresponds to a surface area arithmetically calculated from the length and the thickness.

It is usually preferred that the particle size (length and thickness) distribution be as small as possible. Although it is difficult to quantify the particle size, comparison can be made among, e.g., 500 particles randomly chosen from a transmission electron micrograph. While the size distribution is mostly not normal, the coefficient of variation represented by standard deviation a to the mean (a/mean) is 0.1 to 2.0.

In order to make the particle size distribution sharper, the reaction system for particle formation is made homogenous as much as possible, and the particles produced are subjected to treatment for distribution improvement. For example, selective dissolution of ultra fine particles in an acid solution is among known treatments.

The coercive force (Hc) of the hexagonal ferrite powder used in the invention is preferably about 159.2 to 238.8 kA/m (2000 to 3000 Oe), still preferably 175.1 to 222.9 kA/m (2200 to 2800 Oe), particularly preferably 183.1 to 214.9 kA/m (2300 to 2700 Oe). Where the saturation magnetization (as) of the head exceeds 1.4 T, it is desirable that the coercive force of the magnetic powder be 159.2 kA/m or less. The coercive force can be controlled by the particle size (length and thickness), the kind and amount of constituent elements, the substitution site of elements, conditions of particle forming reaction, and the like.

The hexagonal ferrite powder preferably has a saturation magnetization (as) of 40 to 80 $A \cdot m^2/kg$ (emu/g). A relatively high as within that range is desirable. A saturation magnetization tends to decrease as the particle size becomes smaller. It is well known that the saturation magnetization can be improved by using a magnetoplumbite type ferrite combined with a spinel type ferrite or by properly selecting the kinds and amounts of constituent elements. It is also possible to use a W-type hexagonal ferrite powder.

For the purpose of improving dispersibility, it is practiced to treat ferromagnetic powder with a substance compatible with a dispersing medium and a binder resin. The surface treating substance includes organic or inorganic compounds. Typical examples are oxides or hydroxides of Si, Al or P, silane coupling agents, and titanium coupling agents. The surface treating substance is usually used in an amount of 0.1 to 10% by weight based on the magnetic powder. The pH of the ferrite powder is of importance for dispersibility. The pH usually ranges from about 4 to 12. From the standpoint of chemical stability and storage stability of the magnetic recording medium, a pH of about 6 to 11 is recommended. The optimal p value should be determined according to the dispersing medium and the binder resin to be used. The water content of the ferrite powder is also influential on dispersibility. While varying according to the kinds of the dispersing medium and the binder resin, the optimal water content usually ranges from 0.01 to 2.0% by weight.

The process of preparing ferromagnetic hexagonal ferrite powder to be used in the invention includes, but is not limited to, (i) a process by controlled crystallization of glass which includes the steps of blending barium oxide, iron oxide, an oxide of a metal that is to substitute iron, and a glass forming oxide (e.g., boron oxide) in a ratio providing a desired ferrite composition, melting the blend, rapidly cooling the melt into an amorphous solid, re-heating the solid, washing and grinding the solid to obtain a barium ferrite crystal powder or (ii) a hydrothermal process which includes the steps of neutralizing a solution of barium ferrite-forming metal salts with an alkali, removing by-products, heating in a liquid phase at 100° C. or higher, washing, drying, and grinding to obtain a barium ferrite crystal powder, and (iii) a coprecipitation process which includes the steps of neutralizing a solution of barium ferrite-forming metal salts with an alkali, removing by-products, drying, treating at 1100° C. or lower, and grinding to obtain a barium ferrite crystal powder. If desired, the ferromagnetic hexagonal ferrite powder may be surface treated with 0.1 to 10% by weight of Al, Si, P, an oxide thereof, etc. to reduce adsorption of a lubricant, such as a fatty acid, to 100 $mg/m^2$ or less. Although it is essentially preferred for the ferromagnetic hexagonal ferrite powder to be free of inorganic soluble ions, such as Na, Ca, Fe, Ni, and Sr ions, presence of up to 200 ppm of such ions in total is little influential on the characteristics.

Binders used in the magnetic layer include conventionally known thermoplastic resins, thermosetting resins, reactive resins, and mixtures thereof. Useful thermoplastic resins include homo- or copolymers containing a unit derived from vinyl chloride, vinyl acetate, vinyl alcohol, maleic acid, acrylic acid, an acrylic ester, vinylidene chloride, acrylonitrile, methacrylic acid, a methacrylic ester, styrene, butadiene, ethylene, vinyl butyral, vinyl acetal, a vinyl ether, etc.; polyurethane resins, and various rubber resins. Useful thermosetting or reactive resins include phenolic resins, epoxy resins, thermosetting polyurethane resins, urea resins, melamine resins, alkyd resins, reactive acrylic resins, formaldehyde resins, silicone resins, epoxy-polyamide resins, polyester resin/isocyanate prepolymer mixtures, polyester polyol/polyisocyanate mixtures, and polyurethane/polyisocyanate mixtures. For the details of these resins, *Plastic Handbook*, Asakura Shoten (publisher) can be referred to. Known electron beam (EB)-curing resins can also be used in the magnetic layer. The details of the EB-curing resins and methods of producing them are described in JP-A-62-256219. The above-recited resins can be used either individually or as a combination thereof.

Of the binder resins described supra, polyurethane resins are preferred. Particularly preferred polyurethane resins include (i) one prepared by reacting a long-chain polyol having a cyclic structure (e.g., hydrogenated bisphenol A or a propylene oxide adduct thereof) and an alkylene oxide chain and having a molecular weight of 500 to 5000, a short-chain polyol having a cyclic structure and a molecular weight of 200 to 500 that serves as a chain extender, and an organic diisocyanate and introducing a hydrophilic polar group, (ii) one prepared by reacting a polyester polyol composed of an aliphatic dibasic acid component (e.g., succinic acid, adipic acid or sebacic acid) and an aliphatic diol component having a branched alkyl side chain and containing no cyclic structure (e.g., 2,2-dimethyl-1,3-propanediol, 2-ethyl-2-butyl-1,3-propanediol, or 2,2-diethyl-1,3-propanediol), an aliphatic diol having a branched alkyl side chain containing 3 or more carbon atoms (e.g., 2-ethyl-2-butyl-1,3-propanediol or 2,2-diethyl-1,3-propanediol) that serves as a chain extender, and an organic diisocyanate and introducing a hydrophilic polar group, and (iii) one prepared by reacting a polyol having a cyclic structure (e.g., dimer diol) and a long-chain alkyl group and an organic diisocyanate and introducing a hydrophilic polar group.

The polar group-containing polyurethane resin used in the invention as a binder resin preferably has a number average molecular weight of 5,000 to 100,000, still preferably 10,000 to 50,000. With a number average molecular weight of 5,000 or more, the polyurethane provides a magnetic layer with sufficient strength and durability. With a number average molecular weight of 100,000 or less, the polyurethane exhibits sufficient solvent solubility and dispersing capability for magnetic powder and provides a coating composition whose viscosity is not so high as to impair the handling properties and coating workability.

The polar group that is incorporated into the polyurethane resin includes —COOM, —$SO_3M$, —$OSO_3M$, —P=O$(OM)_2$, —O—P=O$(OM)_2$ (wherein M is a hydrogen atom or an alkali metal base), —OH, —$NR_2$, —$N^+R_3$ (wherein R is a hydrocarbon group), an epoxy group, —SH, and —CN. At least one of these polar groups can be incorporated by copolymerization or addition reaction. The amount of the polar group to be introduced is $10^{-1}$ to 10–8 mol/g, preferably $10^{-2}$ to $10^{-6}$ mol/g. Where the polar group-containing polyurethane resin has a hydroxyl group, the hydroxyl group is preferably a branched hydroxyl group from the viewpoint of curability and durability. It is preferred for the resin to having 2 to 40, still preferably 3 to 20, branched hydroxyl groups per molecule.

Examples of commercially available binder resins which can be used in the invention are VAGH, VYHH, VMCH, VAGF, VAGD, VROH, VYES, VYNC, VMCC, XYHL, XYSG, PKHH, PKHJ, PKHC, and PKFE (from Union Carbide Corp.); MPR-TA, MPR-TA5, MPR-TAL, MPR-TSN, MPR-TMF, MPR-TS, MPR-TM, and MPR-TAO (from Nisshin Chemical Industry Co., Ltd.); 1000w, DX80, DX81, DX82, DX83, and 100FD (from Denki Kagaku Kogyo K.K.); MR-104, MR-105, MR110, MR100, MR555, and 400X-110A (from Zeon Corp.); Nipporan N2301, $N_{23}O_2$, and $N_{23}O_4$ (from Nippon Polyurethane Industry Co., Ltd.); Pandex T-5105, T-R3080, and T-5201, Barnock D-400 and D-210-80, and Crisvon 6109 and 7209 (from Dainippon Ink & Chemicals, Inc.); Vylon UR8200, UR8300, UR-8700, RV530, and RV280 (from Toyobo Co., Ltd.); Daiferamin 4020, 5020, 5100, 5300, 9020, 9022, and 7020 (from Dainichiseika Color & Chemicals Mfg. Co., Ltd.); MX5004 (from Mitsubishi Chemical Corp.); Sanprene SP-150 (from Sanyo Chemical Industries, Ltd.); and Saran F310 and F210 (from Asahi Chemical Industry Co., Ltd.).

The amount of the binder in the magnetic layer is 5 to 50% by weight, preferably 10 to 30% by weight, based on the ferromagnetic powder (ferromagnetic metal powder or ferromagnetic hexagonal ferrite powder). Where a vinyl chloride resin, a polyurethane resin, and polyisocyanate are used in combination, their amounts are selected from a range of 5 to 30% by weight, a range of 2 to 20% by weight, and a range of 2 to 20% by weight, respectively. In case where head corrosion by a trace amount of released chlorine is expected to occur, polyurethane alone or a combination of polyurethane and polyisocyanate can be used. The polyurethane to be used preferably has a glass transition temperature of −500 to 150° C., preferably 0° to 100° C., an elongation at break of 100 to 2000%, a stress at rupture of 0.05 to 10 kg/mm$^2$ (0.49 to 98 Mpa), and a yield point of 0.05 to 10 kg/mm$^2$ (0.49 to 98 Mpa).

The polyisocyanate that can be used in the invention includes tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate. Further included are reaction products between these isocyanate compounds and polyols and polyisocyanates produced by condensation of the isocyanates. Examples of commercially available polyisocyanates that can be used in the invention are Coronate L, Coronate HL, Coronate 2030, Coronate 2031, Millionate MR, and Millionate MTL (from Nippon Polyurethane Industry Co., Ltd.); Takenate D-102, Takenate D-110N, Takenate D-200, and Takenate D-202 (from Takeda Chemical Industries, Ltd.); and Desmodur L, Desmodur IL, Desmodur N, and Desmodur HL (from Sumitomo Bayer Urethane Co., Ltd.). They can be used either individually or as a combination of two or more thereof taking advantage of difference in curing reactivity.

The above-recited binders can be used in not only the agnetic layer but other layers including a nonmagnetic layer (described later) and a backcoating layer. When the magnetic recording medium has two or more magnetic layers, these binder resins can be used in each of the magnetic layers. In such cases, the binder formulation can be, or rather should be, designed for each of the magnetic and the nonmagnetic layers, in terms of the binder content, the proportions of a vinyl chloride resin, a polyurethane resin, polyisocyanate, and other resins, the molecular weight of each resin, the amount of the polar group introduced, and other physical properties of the resins. For the optimization, known techniques relating to a non-magnetic/magnetic multilayer structure can be utilized. For example, to increase the binder content of the magnetic layer is effective to reduce scratches on the magnetic layer, or to increase the binder content of the nonmagnetic layer is effective to increase flexibility thereby to improve head touch.

The magnetic layer can contain additives, such as abrasives, lubricants, dispersing agents or dispersing aids, antifungals, antistatics, antioxidants, solvents, and carbon black, according to necessity. Such additives include molybdenum disulfide, tungsten disulfide, graphite, boron nitride, graphite fluoride, silicone oils, polar group-containing silicones, fatty acid-modified silicones, fluorine-containing silicones, fluorine-containing alcohols, fluorine-containing esters, polyolefins, polyglycols; aromatic ring-containing organic phosphonic acids, such as phenylphosphonic acid, benzylphosphonic acid, phenethylphosphonic acid, α-methylbenzylphosphonic acid, 1-methyl-1-phenethylphosphonic acid, diphenylmethylphosphonic acid, biphenylphosphonic acid, benzylphenylphosphonic acid, α-cumylphosphonic acid, toluylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid, and nonylphenylphosphonic acid, and alkali metal salts thereof; alkylphosphonic acids, such as octylphosphonic acid, 2-ethylhexylphosphonic acid, isooctylphosphonic acid, isononylphosphonic acid, isodecylphosphonic acid, isoundecylphosphonic acid, isododecylphosphonic acid, isohexadecylphosphonic acid, isooctadecylphosphonic acid, and isoeicosylphosphonic acid, and alkali metal salts thereof; aromatic phosphoric acid esters, such as phenyl phosphate, benzyl phosphate, phenethyl phosphate, α-methylbenzyl phosphate, 1-methyl-1-phenethyl phosphate, diphenylmethyl phosphate, biphenyl phosphate, benzylphenyl phosphate, α-cumyl phosphate, toluyl phosphate, xylyl phosphate, ethylphenyl phosphate, cumenyl phosphate, propylphenyl phosphate, butylphenyl phosphate, heptylphenyl phosphate, octylphenyl phosphate, and nonylphenyl phosphate, and alkali metal salts thereof; alkyl phosphates, such as octyl phosphate, 2-ethylhexyl phosphate, isooctyl phosphate, isononyl phosphate, isodecyl phosphate, isoundecyl phosphate, isododecyl phosphate, isohexadecyl phosphate, isooctadecyl phosphate, and isoeicosyl phosphate, and alkali metal salts thereof; alkylsulfonic esters and alkali metal salts thereof; fluorine-containing alkylsulfuric esters and alkali metal salts thereof; monobasic fatty acids having 10 to 24 carbon atoms, either saturated or unsaturated and straight chain or branched, such as lauric acid, myristic acid, palmitic acid, stearic acid, behenic acid, oleic acid, linoleic acid, linolenic acid, elaidic acid, and erucic acid, and metal salts thereof; mono-, di- or polyesters of fatty acids prepared from monobasic fatty acids having 10 to 24 carbon atoms, either saturated or unsaturated and straight-chain or branched, and mono- to hexahydric alcohols having 2 to 22 carbon atoms (either saturated or unsaturated and straight-chain or branched), alkoxyalcohols having 12 to 22 carbon atoms (either saturated or unsaturated and straight-chain or branched) or monoalkyl ethers of alkylene oxide polymers, such as butyl stearate, octyl stearate, amyl stearate, isooctyl stearate, octyl myristate, butyl laurate, butoxyethyl stearate, anhydrosorbitol monostearate, and anhydrosorbitol tristearate; aliphatic acid amides having 2 to 22 carbon atoms; and aliphatic amines having 8 to 22 carbon atoms. The alkyl, aryl or aralkyl moiety of the above-recited additive compounds may be replaced with a nitro group, a halogen atom (e.g., F, Cl or Br), a halogenated hydrocarbon group (e.g., $CF_3$, $CCl_3$ or $CBr_3$) or a like substituent.

Surface active agents that can be used as additives in the magnetic layer include nonionic ones, such as alkylene oxide types, glycerol types, glycidol types, and alkylphenol ethylene oxide adducts; cationicones, such as cyclicamines, ester amides, quaternary ammonium salts, hydantoin derivatives, heterocyclic compounds, phosphonium salts, and sulfonium salts; anionic ones containing an acidic group, such as a carboxyl group, a sulfonic acid group or a sulfuric ester group; and amphoteric ones, such as amino acids, aminosulfonic acids, amino alcohol sulfuric or phosphoric esters, and alkyl betaines. For the details of the surface active agents, refer to Kaimen Kasseizai Binran published by Sangyo Tosho K.K.

The above-recited lubricants, antistatic agents, and like additives do not always need to be 100% pure and may contain impurities, such as isomers, unreacted materials, by-products, decomposition products, and oxides. The proportion of the impurities is preferably 30% by weight at the most, still preferably 10% by weight or less.

Specific examples of the additives are NAA-102, hardened castor oil fatty acids, NAA-42, Cation SA, Nymeen L-201, Nonion E-208, Anron BF, and Anon LG (all available from NOF Corp.), FAL 205 and FAL 123 (from Takemoto Yushi K.K.), Enujelv OL (from New Japan Chemical Co., Ltd.), TA-3 (from Shin-Etsu Chemical Industry Co., Ltd.), Armid P (from Lion Akzo Co., Ltd.), Duomeen TDO (from Lion Corp.), BA 41G (from Nisshin Oil Mills, Ltd.), Profan 2012E, Newpol PE 61, and IonetMS400 (from Sanyo Chemical Industries, Ltd.).

Carbon blacks that can be used in the magnetic layer include furnace black for rubber, thermal black for rubber, carbon black for color, and acetylene black. The carbon black preferably has a specific surface area of 5 to 500 $m^2/g$, a dibutyl phthalate (DBT) oil absorption of 10 to 400 ml/100 g, an average particle size of 5 to 300 nm, a pH of 2 to 10, a water content of 0.1 to 10% by weight, and a tap density of 0.1 to 1 g/ml. Examples of commercially available carbon black products that can be used in the magnetic layer include Black Pearls 2000, 1300, 1000, 900, 905, 800, and 700 and vulcan XC-72 (from Cabot Corp.); #80, #60, #55, #50, and #35 (from Asahi Carbon Co., Ltd.); #2400B, #2300, #900, #1000, #30, #40, and #10B (from Mitsubishi Chemical Corp.); Conductex SC, RAVEN 150, 50, 40 and 15, and RAVEN-MT-P (from Columbian Carbon); and Ketjen Black EC (from Akzo Nobel Chemicals).

Carbon black having been surface treated with a dispersant, etc., resin-grafted carbon black, or carbon black with its surface partially graphitized may be used. Carbon black may previously been dispersed in a binder before being added to a coating composition. The above-enumerated carbon black species can be used either individually or as a combination thereof. The carbon black can be used in an amount of 0.1 to 30% by weight based on the magnetic powder. Carbon black serves for antistatic control, reduction of frictional coefficient, reduction of light transmission, film strength enhancement, and the like. These functions depend on the species. Accordingly, it is understandably possible, or rather desirable, to optimize the kinds, amounts, and combinations of the carbon black species for each layer according to the intended purpose with reference to the above-mentioned characteristics, such as particle size, oil absorption, conductivity, pH, and so forth. In selecting carbon black species for use in the magnetic layer, reference can be made, e.g., to Carbon Black Kyokai (ed.), *Carbon Black Binran*.

Organic solvents known in the art can be used in the preparation of the coating compositions, including ketones, such as methyl ethyl ketone, methyl isobutyl ketone, diisobutyl ketone, cyclohexanone, isophorone, and tetrahydrofuran; alcohols, such as methanol, ethanol, propanol, butanol, isobutyl alcohol, isopropyl alcohol, and methylcyclohexanol; esters, such as methyl acetate, butyl acetate, isobutyl acetate, isopropyl acetate, ethyl lactate, and glycol acetate; glycol ethers, such as glycol dimethyl ether, glycol monoethyl ether, and dioxane; aromatic hydrocarbons, such as benzene, toluene, xylene, cresol, and chlorobenzene; chlorinated hydrocarbons, such as methylene chloride, ethylene chloride, carbon tetrachloride, chloroform, ethylenechlorohydrin, and dichlorobenzene; N,N-dimethylformamide; and hexane. They can be used either individually or as a mixture thereof at an arbitrary mixing ratio.

These organic solvents do not always need to be 100% pure and may contain impurities, such as isomers, unreacted matter, by-products, decomposition products, oxidation products, and water. The impurity content is preferably 30% or less, still preferably 10% or less. The organic solvent used in the formation of the magnetic layer and that used in the formation of the nonmagnetic layer (described below) are preferably the same in kind but may be different in amount. It is advisable to use a solvent with high surface tension (e.g., cyclohexanone or dioxane) in the nonmagnetic layer to improve coating stability. Specifically, it is important that the arithmetic mean of the solvent composition of the upper magnetic layer be equal to or higher than that of the lower nonmagnetic layer. A solvent with somewhat high polarity is preferred for improving dispersing capabilities for powders. The solvent composition preferably contains at least 50% of a solvent having a dielectric constant of 15 or higher. The solubility parameter of the solvent or the solvent composition is preferably 8 to 11.

The kinds and amounts of the above-described dispersing agents, lubricants or surface active agents to be used can be decided as appropriate according to the type of the layer to which they are added. The following is a few illustrative examples of manipulations using these additives. (i) A dispersing agent has a property of being adsorbed or bonded to fine solid particles via its polar groups. It is adsorbed or bonded via the polar groups mostly to the surface of ferromagnetic metal powder when used in a magnetic layer or the surface of nonmagnetic powder in a nonmagnetic layer. It is assumed that, after once being absorbed to metal or metal compound particles, an organophosphorus compound, for instance, is hardly desorbed therefrom. As a result, the ferromagnetic metal powder or nonmagnetic powder treated with a dispersing agent appears to be covered with an alkyl group, an aromatic group or the like, which makes the particles more compatible with a binder resin component and more stable in their dispersed state. (ii) Since lubricants exist in a free state, bleeding of lubricants is controlled by using fatty acids having different melting points between the magnetic layer and the nonmagnetic layer or by using esters different in boiling point, melting point or polarity between the magnetic layer and the nonmagnetic layer. (iii) Coating stability is improved by adjusting the amount of a surface active agent. (iv) The amount of the lubricant in the nonmagnetic layer is increased to improve the lubricating effect.

All or part of the additives can be added at any stage of preparing the magnetic or nonmagnetic coating composition. For example, the additives can be blended with the magnetic powder before kneading, or be mixed with the magnetic powder, the binder, and a solvent in the step of kneading, or be added during or after the step of dispersing or immediately before coating.

The magnetic recording medium of the present invention may have a nonmagnetic layer between the magnetic layer and the nonmagnetic support. Providing a nonmagnetic layer makes it easier to form the magnetic layer with a reduced thickness suited to high density recording.

The nonmagnetic layer manifests its effects as long as it is substantially non-magnetic. The effects of the nonmagnetic layer will be exhibited even where it contains a small amount of a magnetic substance, either intentionally or unintentionally. Such a layer structure is understandably construed as being included under the scope of the present invention. The term "substantially non-magnetic" as referred to above is intended to mean that the nonmagnetic layer has a residual magnetic flux density of 10 m-T or less or a coercive force Hc of 8 kA/m (100 Oe) or less. Desirably, the nonmagnetic layer has neither residual magnetic flux density nor coercive force. The amount of the magnetic powder, if any, in the nonmagnetic layer is preferably less than a half the weight of the total inorganic powder of the nonmagnetic layer.

The nonmagnetic layer may be replaced with a soft magnetic layer containing soft magnetic powder and a binder. In that case, the thickness of the soft magnetic layer is the same as that of the nonmagnetic layer.

The nonmagnetic layer preferably contains nonmagnetic inorganic powder and a binder as main components. The nonmagnetic inorganic powder used in the nonmagnetic layer is selected from inorganic compounds, such as metal oxides, metal carbonates, metal sulfates, metal nitrides, metal carbides, and metal sulfides. Examples of the inorganic compounds are titanium oxides (e.g., titanium dioxide), cerium oxide, tin oxide, tungsten oxide, ZnO, $ZrO_2$, $Cr_2O_3$, α-alumina (with an α-phase content of 90% to 100%), β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide. They can be used either individually or in combination. Preferred among them are α-iron oxide and titanium oxide.

The shape of the nonmagnetic powder particles may be any of needle-like, spherical, polygonal and tabular shapes. The crystallite size of the nonmagnetic powder is preferably 4 nm to 1 μm, still preferably 40 to 100 nm. Particles with the crystallite size ranging from 4 nm to 1 μm are not difficult to disperse and provide a nonmagnetic layer with appropriate surface roughness. The nonmagnetic powder preferably has an average particle size of 5 nm to 2 μm. In this preferred range of an average particle size, the particles are satisfactorily dispersible and provide a nonmagnetic layer with appropriate surface roughness. If desired, nonmagnetic powders different in average particle size may be used in combination, or a single kind of a nonmagnetic powder having a broadened size distribution may be used to produce the same effect. A still preferred particle size of the nonmagnetic powder is 10 to 200 nm. The specific surface area of the nonmagnetic powder ranges 1 to 100 $m^2/g$, preferably 5 to 70 $m^2/g$, still preferably 10 to 65 $m^2/g$. In this preferred specific surface area range, the nonmagnetic powder provides appropriate surface roughness and is dispersible in a desired amount of a binder. The oil (DBP) absorption of the powder is 5 to 100 ml/100 g, preferably 10 to 80 ml/100 g, still preferably 20 to 60 ml/100 g. The specific gravity of the powder is 1 to 12, preferably 3 to 6. The tap density of the powder is 0.05 to 2 g/ml, preferably 0.2 to 1.5 g/ml. Having the tap density falling within this range, the powder is easy to handle with little dusting and tends to be less liable to stick to equipment. The nonmagnetic powder preferably has a pH of 2 to 11, still preferably between 6 and 9. Within this preferred pH range, an increase in frictional coefficient of the magnetic recording medium in a high temperature and high humidity condition or due to migration of a fatty acid can be averted. The water content of the nonmagnetic powder is 0.1 to 5% by weight, preferably 0.2 to 3% by weight, still preferably 0.3 to 1.5% by weight. Within the preferred water content range, the powder is easy to disperse, and the resulting coating composition has a stable viscosity. The ignition loss of the powder is preferably not more than 20% by weight. The smaller the ignition loss, the better.

The inorganic nonmagnetic powder preferably has a Mohs hardness of 4 to 10 for securing durability. The nonmagnetic powder preferably has a stearic acid adsorption of 1 to 20 $μmol/m^2$, still preferably 2 to 15 $μmol/m^2$. The heat of wetting of the nonmagnetic powder with water at 25° C. is preferably 200 to 600 erg/cm$^2$ (200 to 600 mJ/m$^2$). Solvents in which the nonmagnetic powder releases the recited heat of wetting can be used. The number of water molecules on the nonmagnetic powder at 100° to 400° C. is suitably 1 to 10 per 10 nm. The isoelectric point of the nonmagnetic powder in water is preferably pH 3 to 9.

It is preferred that a surface layer of $Al_2O_3$, $SiO_2$, $TiO_2$, $ZrO_2$, $SnO_2$, $Sb_2O_3$, or ZnO be present on the surface of the nonmagnetic powder by surface treatment. Amongst hem, preferred for dispersibility are $Al_2O_3$, $SiO_2$, $TiO_2$, and $ZrO_2$, with $Al_2O_3$, $SiO_2$, and $ZrO_2$ being still preferred. These surface treating substances may be used either individually or in combination. According to the purpose, a composite surface layer can be formed by co-precipitation or a method comprising first applying alumina to the nonmagnetic particles and then treating with silica or vise versa. The surface layer may be porous for some purposes, but a homogeneous and dense surface layer is usually preferred.

Specific examples of commercially available nonmagnetic powders that can be used in the nonmagnetic layer include Nanotite (from Showa Denko K.K.); HIT-100 and ZA-Gl (both from Sumitomo Chemical Co., Ltd.); DPN-250, DPN-250BX, DPN-245, DPN-270BX, DPB-550BX, and DPN-550RX (from Toda Kogyo Corp.); titanium oxide series TTO-51B, TTO-55A, TTO-55B, TTO-55C, TTO-55S, and TTO-55D, SN-100, MJ-7, and α-iron oxide series E270, E271, and E300 (from Ishihara Sangyo Kaisha, Ltd.); STT-4D, ST-30D, STT-30, and STT-65C (from Titan Kogyo K.K.); MT-100S, MT-100T, MT-150W, MT-500B, MT-600B, T-100F, and T-500HD (from Tayca Corp.); FINEX-25, BF-1, BF-10, BF-20, and ST-M (from Sakai Chemical Industry Co., Ltd.); DEFIC-Y and DEFIC-R (from Dowa Mining Co., Ltd.); AS2BM and TiO2P25 (from Nippon Aerosil Co., Ltd.); 100A and 500A (from Ube Industries, Ltd.); and Y-LOP (from Titan Kogyo K.K.) and calcined products thereof. Preferred of them are titanium dioxide and α-iron oxide.

Carbon black can be incorporated into the nonmagnetic layer to reduce the surface resistivity, to decrease light transmission, and to obtain a desired micro Vickers hardness. The nonmagnetic layer generally has a micro Vickers hardness of 25 to 60 kg/mm$^2$ (245 to 588 MPa). A preferred micro Vickers hardness for good head touch is 30 to 50 kg/mm$^2$ (294 to 490 MPa). A micro Vickers hardness can be measured with a thin film hardness tester (HMA-400 supplied by NEC Corp.) having an indenter equipped with a three-sided pyramid diamond tip, 80° angle and 0.1 μm end radius. Magnetic recording tapes are generally standardized to have an absorption of not more than 3% for infrared rays of around 900 nm. For example, the absorption of VHS tapes is standardized to be not more than 0.8%. Useful carbon black species for these purposes include furnace black for rubber, thermal black for rubber, carbon black for colors, and acetylene black.

The carbon black in the nonmagnetic layer has a specific surface area of 100 to 500 m$^2$/g, preferably 150 to 400 m$^2$/g, an oil (DBP) absorption of 20 to 400 ml/100 g, preferably 30 to 200 ml/100 g, and an average particle size of 5 to 80 nm, preferably 10 to 50 nm, still preferably 10 to 40 nm. The carbon black preferably has a pH of 2 to 10, a water content of 0.1 to 10% by weight, and a tap density of 0.1 to 1 g/ml.

Specific examples of commercially available carbon black products for use in the nonmagnetic layer include Black Pearls 2000, 1300, 1000, 900, 800, 880, and 700, and Vulcan XC-72 (from Cabot Corp.); #3050B, #3150B, #3250B, #3750B, #3950B, #950, #650B, #970B, #850B, and MA-600 (from Mitsubishi Chemical Corp.); Conductex SC and RAVEN 8800, 8000, 7000, 5750, 5250, 3500, 2100, 2000, 1800, 1500, 1255, and 1250 (from Columbian Carbon); and Ketjen Black EC (from Akzo Nobel Chemicals).

Carbon black having been surface treated with a dispersant, etc., resin-grafted carbon black, or carbon black with its surface partially graphitized may be used. Carbon black may previously been dispersed in a binder before being added to a coating composition. Carbon black is used in an amount of 50% by weight or less based on the above-described inorganic powder and 40% by weight or less based on the total weight of the nonmagnetic layer. The above-recited carbon black species can be used either individually or as a combination thereof. In selecting carbon black species for use in the nonmagnetic layer, reference can be made, e.g., to Carbon Black Kyokai (ed.) *Carbon Black Binran.*

The nonmagnetic layer can contain organic powder according to the purpose. Useful organic powders include acrylic-styrene resin powders, benzoguanamine resin powders, melamine resin powders, and phthalocyanine pigments. Polyolefin resin powders, polyester resin powders, polyamide resin powders, polyimide resin powders, and polyethylene fluoride resin powders are also usable. Methods of preparing these resin powders are disclosed, e.g., in JP-A-62-18564 and JP-A-60-255827.

With respect to the other details of the nonmagnetic layer, that is, selection of the kinds and amounts of binder resins, lubricants, dispersants, additives, and solvents and methods of dispersing, the techniques as for the magnetic layer apply. In particular, known techniques with regard to the amounts and kinds of binder resins, additives, and dispersants to be used in a magnetic layer are useful.

The backcoating layer of the magnetic recording medium of the invention preferably contains carbon black and inorganic powder. It is preferred to use two carbon black species different in average particle size, i.e., fine carbon black particles having an average particle size, e.g., of 10 to 60 nm and coarse carbon black particles having an average particle size, e.g., of 70 to 270 nm, in combination. In general, addition of fine carbon black particles results in low surface resistivity and low light transmission of the back coating layer. In view of the fact that many magnetic recording systems utilize a transmission of a magnetic tape as an operational signal, addition of fine carbon black particles is specially effective for applications to this kind of systems. Besides, fine carbon black particles are generally excellent in liquid lubricant holding capability and therefore contributory to reduction of the coefficient of friction in cooperation with the lubricant. The coarse carbon black particles, on the other hand, function as a solid lubricant. Furthermore, the coarse particles form micro projections on the backcoating layer surface to reduce the contact area, which contributes to reduction of the frictional coefficient.

Examples of commercially available fine or coarse carbon black particles that can be utilized in the invention are described in WO 98/35345.

In using two kinds of carbon black having different average particle sizes in the backcoating layer, the weight ratio of fine particles to coarse particles is preferably 98:2 to 75:25, still preferably 95:5 to 85:15.

The total carbon black content in the backcoating layer usually ranges from 30 to 80 parts by weight, preferably 45 to 65 parts by weight, per 100 parts by weight of the binder.

It is preferred to use two kinds of inorganic powder different in hardness in the back coating layer. Specifically, it is preferred to use a soft inorganic powder having a Mohs hardness of 3 to 4.5 and a hard inorganic powder having a Mohs hardness of 5 to 9 in combination. Addition of a soft inorganic powder having a Mohs hardness of 3 to 4.5 is effective to stabilize the frictional coefficient in repeated running. Hardness of this level will not grind down the guide poles. The soft inorganic powder preferably has an average particle size of 30 to 50 nm.

The soft inorganic powders having a Mohs hardness of 3 to 4.5 include calcium sulfate, calcium carbonate, calcium silicate, barium sulfate, magnesium carbonate, zinc carbonate, and zinc oxide. They can be used either individually or as a combination of two or more thereof. The content of the soft inorganic powder in the backcoating layer is preferably 10 to 140 parts by weight, still preferably 35 to 100 parts by weight, per 100 parts by weight of carbon black in the backcoating layer.

The hard inorganic powder having a Mohs hardness of 5 to 9 enhances the strength of the backcoating layer and thereby improves the running durability of the recording medium. A combined use of the hard inorganic powder with carbon black and the soft inorganic powder provides a stronger backcoating layer less susceptible to deterioration by repeated sliding. Moreover, existence of the hard inorganic powder in the backcoating layer produces moderate abrasive properties to reduce adhesion of grinding debris to tape guide poles, etc. When, in particular, used in combination with the soft one, the hard inorganic powder improves sliding properties on guide poles with a rough surface and thereby stabilizes the frictional coefficient of the back coating layer. The hard inorganic powder preferably has an average particle size of 80 to 250 nm, still preferably 100 to 210 nm.

The hard inorganic powder with a Mohs hardness of 5 to 9 includes α-iron oxide, α-alumina, and chromium oxide ($Cr_2O_3$) These powders can be used either individually or as a combination. Preferred of them is α-iron oxide or α-alumina. The content of the hard inorganic powder is usually 3 to 30 parts by weight, preferably 3 to 20 parts by weight, per 100 parts by weight of carbon black.

Where the soft inorganic powder and the hard inorganic powder are used in combination, they are preferably selected to have a hardness difference of 2 or greater, still preferably 2.5 or greater, especially preferably 3 or greater. It is most desirable for the backcoating layer to contain both the two kinds of inorganic powders different in Mohs hardness and having the respective specific average particle sizes and the two kinds of carbon black powders different in average particle size.

The backcoating layer may contain lubricants. Lubricants for the backcoating layer can be chosen from those described above for use in the magnetic layer. The lubricant can be added usually in an amount of 1 to 5 parts by weight per 100 parts by weight of the binder.

If desired, an undercoating layer for adhesion improvement may be provided between the nonmagnetic support and the nonmagnetic layer. The undercoating layer usually has a thickness of 0.5 μm or smaller. The undercoating layer is usually formed of an organic solvent-soluble polyester resin.

The nonmagnetic support preferably has a thickness of 2 to 80 μm. In particular, the thickness of the support for computer tapes is preferably 3.5 to 7.5 μm, still preferably 3.0 to 7.0 μm. The thickness of the undercoating layer is preferably 0.01 to 0.8 μm, still preferably 0.02 to 0.6 μm. The thickness of the backcoating layer is preferably 0.1 to 1.0 μm, still preferably 0.2 to 0.8 μm.

The thicknesses of the nonmagnetic and the magnetic layers are optimized according to the saturation magnetization and the head gap of the head used and the recording signal band. In this invention, the thickness of the magnetic layer usually ranges from 0.01 to 0.1 μm, preferably 0.02 to 0.08 μm, still preferably 0.03 to 0.08 μm, with a coefficient of thickness variation being preferably within ±50%, still preferably ±40%. The magnetic layer may have a multilayer structure composed of two or more magnetic layers different in magnetic characteristics. Known technologies with reference to such a multilayer magnetic layer structure can be applied. The thickness of the nonmagnetic layer is 0.2 to 5.0 μm, preferably 0.3 to 3.0 μm, still preferably 1.0 to 2.5 μm.

The method of preparing coating compositions for forming the magnetic layer and the nonmagnetic layer includes at least the steps of kneading and dispersing and, if desired, the step of mixing which is provided before or after the step of kneading and/or the step of dispersing. Each step may be carried out in two or more divided stages. Any of the materials, including the magnetic powder, nonmagnetic powder, binder, carbon black, abrasive, antistatic, lubricant, and solvent, can be added at the beginning of or during any step. Individual materials may be added in divided portions in two or more steps. For example, polyurethane may be added dividedly in the kneading step, the dispersing step, and a mixing step which is provided for adjusting the viscosity of the dispersion. Known techniques for coating composition preparation can be applied as a part of the method. The kneading step is preferably performed using a kneading machine with high kneading power, such as an open kneader, a continuous kneader, a pressure kneader, and an extruder. In using a kneader, the magnetic or nonmagnetic powder, a part (preferably at least 30% of the total binder) or the whole of the binder, and 15 to 500 parts by weight of a solvent per 100 parts by weight of the magnetic or nonmagnetic powder are kneaded together. For the details of the kneading operation, reference can be made to JP-A-1-106338 and JP-A-1-79274. In the step of dispersing, glass beads can be used to disperse the magnetic or nonmagnetic mixture. Zirconia beads, titania beads or steel beads, which are high-specific-gravity dispersing media, are suitable. The size and mixing ratio of the dispersing medium should be optimized. Known dispersing machines can be used.

The magnetic recording medium of the invention is typically produced by coating a moving nonmagnetic support with a coating composition by a wet coating technique to give a dry thickness as designed. A plurality of coating compositions, whether magnetic or nonmagnetic, may be applied successively or simultaneously. Coating equipment includes an air doctor (air knife) coater, a blade coater, a rod coater, an extrusion coater, a squeegee coater, an impregnation coater, a reverse roll coater, a transfer roll coater, a gravure coater, a kiss roll coater, a cast coater, a spray coater, and a spin coater. For the details of coating techniques, reference can be made to *Saishin Coating Gijyutsu*, published by Sogo Gijyutsu Center, 1983.

In the production of tape media, the ferromagnetic powder is oriented in the machine direction using cobalt magnets or a solenoid. In the case of disk media, although sufficiently isotropic orientation could sometimes be obtained without orientation using an orientation apparatus, it is preferred to use a known random orientation apparatus in which cobalt magnets are obliquely arranged in an alternate manner or an alternating magnetic field is applied with a solenoid. In using ferromagnetic metal powder, the "isotropic orientation" is preferably in-plane, two-dimensional random orientation but may be in-plane and vertical three-dimensional random orientation. While hexagonal ferrite powder is liable to have in-plane and vertical three-dimensional random orientation but could have in-plane two-dimensional random orientation. It is also possible to provide a disk with circumferentially isotropic magnetic characteristics by vertical orientation in a known manner, for example, by using facing magnets with their polarities opposite. Vertical orientation is particularly preferred for high density recording. Circumferential orientation may be achieved by spin coating.

It is preferred that the temperature and amount of drying air and the coating speed be adjusted to control the drying position of the coating layer. The coating speed is preferably 20 to 1000 m/min, and the drying air temperature is preferably 60° C. or higher. The coating layer may be pre-dried before entering the magnet zone.

After drying, the coating layer is usually subjected to smoothing using, for example, supercalender rolls. By the smoothing treatment, the voids generated by the solvent being released on drying disappear to increase the packing density of the ferromagnetic powder in the magnetic layer thereby providing a magnetic recording medium with improved electromagnetic characteristics. Calendering is carried out with rolls of heat-resistant plastics, such as epoxy resins, polyimide, polyamide and polyimide-amide. Metallic rolls are also usable.

It is preferred for the magnetic recording medium of the invention to have extremely good surface smoothness with a three-dimensional surface roughness SRa of 0.1 to 4 nm, more preferably 1 to 3 nm (cut-off length: 0.25 mm). Such high smoothness can be achieved by, for example, calendering the magnetic layer formed of a specifically selected combination of ferromagnetic powder and a binder. Calendering is preferably carried out at a roll temperature of 60° to 100° C., still preferably 70° to 100° C., particularly preferably 800 to 100° C., under a pressure of 100 to 500 kg/cm (98 to 490 kN/m), still preferably 200 to 450 kg/cm (196 to 441 kN/m), particularly preferably 300 to 400 kg/cm (294 to 392 kN/m).

A calendered film is usually subjected to heat treatment for the purpose of reducing thermal shrinkage. The heat treatment as a means for reducing thermal shrinkage can be performed by a method in which the film in web form is heated while handling under low tension or a method in which a tape wound on a hub (e.g., a bulk roll or a tape pack in a cassette) is bulk-heated. The latter method is preferred for providing a magnetic recording medium having high output and low noise.

The resulting magnetic recording medium is cut to sizes or widths by means of a slitter, etc. While any type of slitters is usable, those having a plurality of sets of a rotating upper or male knife and a rotating lower or female knife are preferred. The slitting speed, depth of engagement between the upper and the lower knives, upper knife to lower knife ratio of peripheral speed, hour of continuous use of the knives, and the like are decided appropriately.

The magnetic layer of the magnetic recording medium according to the invention preferably has a saturation flux density of 100 to 300 m·T and a coercive force Hc of 143.3 to 318.4 kA/m (1800 to 4000 Oe), still preferably 159.2 to 278.6 kA/m (2000 to 3500 Oe). The narrower the coercive force distribution, the better. In this connection, SFD and SFDr are preferably 0.6 or smaller, still preferably 0.2 or smaller.

The magnetic recording medium of the invention has a frictional coefficient of 0.5 or less, preferably 0.3 or less, on a head at temperatures of −10° to 40° C. and humidities of 0 to 95%. The surface resistivity on the magnetic surface is preferably $10^4$ to $10^{12}$ Ω/sq. The static potential is preferably −500 to +500 V. The magnetic layer preferably has an elastic modulus at 0.5% elongation of 100 to 2000 kg/mm² (0.98 to 19.6 GPa) in every in-plane direction and a breaking strength of 10 to 70 kg/mm² (98 to 686 Mpa). The magnetic recording medium preferably has an elastic modulus of 100 to 1500 kg/mm² (0.98 to 14.7 GPa) in every in-plane direction, a residual elongation of 0.5% or less, and a thermal shrinkage of 1% or less, still preferably 0.5% or less, especially preferably 0.1% or less, at temperatures of 100° C. or lower.

The glass transition temperature (maximum loss elastic modulus in dynamic viscoelasticity measurement at 110 Hz) of the magnetic layer is preferably 500 to 180° C., and that of the nonmagnetic layer is preferably 0° to 180° C. The loss elastic modulus preferably ranges $1\times10^7$ to $8\times10^8$ Pa ($1\times10^8$ to $8\times10^9$ dyne/cm²). The loss tangent is preferably 0.2 or lower. Too high a loss tangent easily leads to a tack problem. It is desirable that these thermal and mechanical characteristics be substantially equal in all in-plane directions with differences falling within 10%.

The residual solvent content in the magnetic layer is preferably 10 mg/m² or less, still preferably 10 mg/m² or less. The magnetic layer and the nonmagnetic layer each preferably have a void of 30% by volume or less, still preferably 20% by volume or less. While a lower void is better for high output, there are cases in which a certain level of void is recommended. For instance, a relatively high void is often preferred for disk media, which put weight on durability against repeated use.

With respect to the 3D surface profile of the magnetic layer, the maximum height $S_{max}$ is preferably 0.5 µm or smaller; the 10 point mean roughness $S_z$ is preferably 0.3 µm or smaller; the maximum mean surface-to-peak height $S_p$ is preferably 0.3 µm or smaller; the maximum mean surface-to-valley depth $S_v$ is preferably 0.3 µm or smaller; the mean surface area ratio Sr is preferably 20% to 80%; and the average wavelength $\lambda_a$ is preferably 5 to 300 µm. A desired magnetic layer's surface profile is easily obtained by, for example, controlling the surface profile of the polymer support (which can be done by means of a filler) or selecting the surface profile of calendering rolls. Curling of the magnetic recording medium is preferably within ±3 mm.

Where the magnetic recording medium has a dual layer structure having a nonmagnetic layer, it is easily anticipated that the physical properties are varied between the upper magnetic layer and the lower nonmagnetic layer according to the purpose. For example, the elastic modulus of the magnetic layer can be set relatively high to improve running durability, while that of the nonmagnetic layer can be set relatively low to improve head contact.

EXAMPLES

The present invention will now be illustrated in greater detail with reference to Examples, but it should be understood that the invention is not construed as being limited thereto. Unless otherwise noted, all the percents and parts are by weight.

EXAMPLE 1

1) Preparation of Coating Composition for Magnetic Layer

| | |
|---|---|
| Needle-like ferromagnetic metal powder | 100 parts |
| Fe/Co/Al/Y = 67/20/8/5; surface treating compound: $Al_2O_3$ and $Y_2O_3$; Hc: 183 kA/m; crystallite size: 12.5 nm; particle length: 45 nm; acicular ratio: 6; $S_{BET}$: 45 m²/g; σs: 140 A·m²/kg (140 emu/g) | |

-continued

| | |
|---|---|
| Polyurethane resin | 12 parts |
| branched side chain-containing polyester | |
| polyol/diphenylmethane diisocyanate type; —SO₃Na group | |
| content: 70 eq/ton | |
| α-Alumina (average particle size: 0.06 μm) | 2 parts |
| Carbon black (average particle size: 20 μm) | 2 parts |
| Cyclohexanone | 110 parts |
| Methyl ethyl ketone | 100 parts |
| Toluene | 100 parts |
| Butyl stearate | 2 parts |
| Stearic acid | 1 part |

2) Preparation of Coating Composition for Nonmagnetic Layer

| | |
|---|---|
| Nonmagnetic inorganic powder (α-iron oxide) | 85 parts |
| surface treating compound: Al₂O₃ and SiO₂; average length: | |
| 0.15 μm; tap density: 0.8 g/ml; acicular ratio: 7; $S_{BET}$: | |
| 52 m²/g; pH: 8; DBP absorption: 33 ml/100 g | |
| Carbon black | 20 parts |
| DBP absorption: 120 ml/100 g; pH: 8; $S_{BET}$: 250 m²/g; | |
| volatile content: 1.5% | |
| Polyurethane resin | 12 parts |
| branched side chain-containing polyester | |
| polyol/diphenylmethane diisocyanate type; —SO₃Na group | |
| content: 70 eq/ton | |
| Acrylic resin | 6 parts |
| benzyl methacrylate/diacetoneacrylamide; —SO₃Na group | |
| content: 60 eq/ton | |

The components shown in each of the above-described formulations were kneaded in an open kneader for 60 minutes and dispersed in a sand mill for 120 minutes. Six parts of a trifunctional, low-molecular polyisocyanate compound (Coronate 3041, available from Nippon Polyurethane Industry Co., Ltd.) was added to each of the resulting magnetic and nonmagnetic dispersions, followed by further stirring for 20 minutes. The resulting mixtures were each filtered through a filter having an average pore size of 1 μm to prepare a magnetic coating composition for magnetic layer and a nonmagnetic coating composition for nonmagnetic layer.

3) Preparation of Coating Composition for Backcoating Layer

The components of formulation A shown below were preliminarily kneaded in a roll mill. A dispersion having formulation B shown below was added thereto, and the mixture was dispersed in a sand grinder. Five parts of a polyester resin and 5 parts of polyisocyanate were added to the dispersion to prepare a coating composition for backcoating layer.

Formulation A:

| | |
|---|---|
| Carbon black (average particle size: 40 nm) | 100 parts |
| Nitrocellulose (RS½ available from Asahi Chemical Industry Co., Ltd.) | 50 parts |
| Polyurethane resin (Tg: 50° C.) | 40 parts |
| Dispersant system | |
| Copper oleate | 5 parts |
| Copper phthalocyanine | 5 parts |
| Precipitated barium sulfate | 5 parts |
| Methyl ethyl ketone | 500 parts |
| Toluene | 500 parts |

Formulation B:

| | |
|---|---|
| Carbon black (average particle size: 150 nm) | 100 parts |
| Nitrocellulose (RS½ available from Asahi Chemical Industry Co., Ltd.) | 40 parts |
| Polyurethane resin | 10 parts |
| Methyl ethyl ketone | 300 parts |
| Toluene | 300 parts |

4) Production of Magnetic Tape

A 7 μm thick, two-layered polyethylene 2,6-naphthalate (PEN) base film having an intrinsic viscosity of 0.50 dl/g and a number average molecular weight (Mn) of 16000 was prepared and subjected to a corona discharge treatment. The PEN base film had a tracer system three-dimensional surface roughness SRa of 4 nm on its surface A (of the magnetic layer side) and 9 nm on its surface B (of the backcoating layer side). The coating composition for magnetic layer was applied to the surface A to a dry thickness of 1.5 μm. Immediately thereafter, the coating composition for nonmagnetic layer was applied thereon to a dry thickness of 0.1 μm by wet-on-wet coating. While the coating layers were wet, the coated film was subjected to magnetic orientation using a magnet having a flux density of 300 T·m (3000 gauss) and dried. The coating composition for backcoating layer was applied to the surface B of the base film to a dry thickness of 0.5 μm. After drying, the coated film was smoothed on a 7-roll calender set at 90° C. under a linear pressure of 300 kg/cm and then heat treated at 70° C. for 48 hours. The resulting film was slit into half-inch magnetic tape.

Examples 2 to 10 and Comparative Example 1

Magnetic tape was prepared in the same manner as in Example 1, except for using the base film shown in Table 1 below.

Reference Example

Magnetic tape was prepared in the same manner as in Example 1, except for using the base film shown in Table 1 below.

The physical properties of the nonmagnetic base films were measured as follows.

(1) Intrinsic Viscosity (IV)

The polyester film was dissolved in a 60/40 (by weight) mixture of phenol and 1,1,2,2-tetrachloroethane at several concentrations. Measurement was made with an automatic viscometer equipped with a Ubbellohde type capillary at 25° C.

(2) Number Average Molecular Weight (Mn)

The polyester film was dissolved in hexafluoroisopropyl alcohol (HFIP) and analyzed with a gel-permeation chromatograph HLC-8220 (supplied by Tosoh Corp.) equipped with two columns Super HM-M (column temperature: 40° C.) using HFIP as an eluent. The Mn of the polyester was read from a calibration curve prepared using polymethyl methacrylate having a known Mn.

(3) Tracer System Three-Dimensional Surface Roughness (SRa)

Measured with a stylus type profilometer manufactured by Kosaka Laboratory Ltd. in accordance with JIS B0601.

The tape samples prepared were evaluated as follows. The results are shown in Table 1.

(1) S/N Ratio (Error Rate)

Signals written on the magnetic tape were read in an 8/10 conversion PR1 equalization system to calculate the S/N ratio. The results were expressed relatively taking the S/N ratio of Example 1 as 0 dB.

(2) Tape Pack Wind Quality

The magnetic tape was wound into a cartridge. Prescribed signals were recorded on the tape on an LTO-Gen 1 drive. After rewinding once in an environment of 23° C. and 50% RH, the cartridge was disassembled to observe the tape pack from the transparent flange side of the reel. The tape pack condition was graded A to D according to the number of irregularities as follows.

A: No irregularity
B: One irregularity
C: Two to five irregularities
D: Six or more irregularities (3) Output Reduction Due to Off-Track Positioning (Servo Characteristics)

Signals (recording wavelength: 0.4 μm) were written on the magnetic tape at 5° C. and 10% RH and read on an LTO-Gen 1 drive. The output obtained by reading at 40° C. and 80% RH was compared with that obtained at 5° C. and 10% RH to calculate a percent output reduction. The difference between the write track width of the writing head and the read track width of the reading head (MR head) was as shown in Table 1.

This application is based on Japanese Patent application JP 2004-28927, filed Feb. 5, 2004, the entire content of which is hereby incorporated by reference, the same as if set forth at length.

What is claimed is:

1. A magnetic recording medium for being used in a write/read system in which a difference of track width between write track width and read track width is smaller than 10 μm, which comprises: a magnetic layer containing ferromagnetic powder and a binder; a nonmagnetic support; and a backcoating layer, in this order, at least one of the magnetic layer and the backcoating layer having servo signals for tracking control pre-recorded therein, wherein the nonmagnetic support is a film of a polyester having an intrinsic viscosity of 0.40 to 0.60 dl/g and a number average molecular weight of 12000 to 24000.

2. The magnetic recording medium according to claim 1, wherein the nonmagnetic support is a laminate polyester film composed of at least two layers and having a first surface A on a side of the magnetic layer and a second surface B on a side of the backcoating layer, the surface A having a tracer system three-dimensional surface roughness SRa (A) of 1 to 6 nm, the surface B having a tracer system three-dimensional surface roughness SRa (B) of 6 to 10 nm, and the SRa (A) being smaller than the SRa (B).

3. The magnetic recording medium according to claim 2, which further comprises a nonmagnetic layer containing nonmagnetic powder and a binder between the nonmagnetic support and the magnetic layer.

TABLE 1

| | Nonmagnetic Support | | | | | Tape | | |
|---|---|---|---|---|---|---|---|---|
| | Track Width Difference (μm) | Polymer Material | Mn of Polymer | IV of Polymer (dl/g) | SRa (A) (nm) | SRa (B) (nm) | S/N Ratio (dB) | Pack Wind Quality | Output Reduction (%) |
| Ex. 1 | 7 | PEN | 16000 | 0.50 | 4 | 9 | 0 | A | 2.2 |
| Ex. 2 | 7 | PEN | 12000 | 0.41 | 4 | 9 | 0.1 | A | 4.1 |
| Ex. 3 | 7 | PEN | 24000 | 0.58 | 4 | 9 | 0.3 | A | 1.0 |
| Ex. 4 | 7 | PEN | 16000 | 0.50 | 1.5 | 8 | 1.5 | B | 2.1 |
| Ex. 5 | 7 | PEN | 16000 | 0.50 | 6 | 9 | −0.6 | A | 2.3 |
| Ex. 6 | 7 | PEN | 16000 | 0.50 | 4 | 6 | 0.4 | B | 2.1 |
| Ex. 7 | 7 | PEN | 16000 | 0.50 | 4 | 10 | −0.5 | A | 2.5 |
| Ex. 8 | 9 | PEN | 16000 | 0.50 | 4 | 9 | 0 | A | 0.2 |
| Ex. 9 | 7 | PEN | 16000 | 0.50 | 7 | 8 | −2.5 | A | 2.3 |
| Ex. 10 | 7 | PEN | 16000 | 0.50 | 4 | 4 | 0.1 | D | 2.1 |
| Comp. Ex. 1 | 7 | PEN | 8000 | 0.38 | 4 | 9 | 0.1 | A | 12.5 |
| Ref. Ex. 1 | 14 | PEN | 8000 | 0.50 | 4 | 8 | 0.1 | A | 1.1 |

As is shown in Table 1, the polyester support used in Comparative Example 1 has a small intrinsic viscosity and a small number average molecular weight. As a result, the medium of Comparative Example 1 suffers from a large output reduction due to off-track errors. On the other hand, the media according to the present invention (Examples 1 to 10) show outstanding improvements over the conventional comparative one in suppression of output reduction due to off-track errors (servo characteristics) and maintenance of a high S/N ratio. It is seen that tape pack wind quality is improved by appropriately adjusting the surface conditions of the magnetic layer side and the backcoating layer side of the nonmagnetic support. It is also seen from a comparison with Reference Example that the present invention exerts noticeable effects when applied to write/read systems having a write track width/read track width difference of less than 10 μm.

4. The magnetic recording medium according to claim 2, wherein the SRa (A) is 2 to 5 nm.

5. The magnetic recording medium according to claim 1, which further comprises a nonmagnetic layer containing nonmagnetic powder and a binder between the nonmagnetic support and the magnetic layer.

6. The magnetic recording medium according to claim 1, wherein the intrinsic viscosity is 0.45 to 0.55 dl/g.

7. The magnetic recording medium according to claim 1, wherein the number average molecular weight is 14000 to 20000.

8. The magnetic recording medium according to claim 1, wherein the backcoating layer contains carbon black and inorganic powder.

* * * * *